April 18, 1944.   G. MILLER   2,346,695
ELECTRIC WATER LIGHT
Filed Dec. 16, 1941   2 Sheets-Sheet 2

INVENTOR
BY Gustave Miller
ATTORNEY

Patented Apr. 18, 1944

2,346,695

UNITED STATES PATENT OFFICE 2,346,695

ELECTRIC WATER LIGHT

Gustave Miller, New Haven, Conn.

Application December 16, 1941, Serial No. 423,176

19 Claims. (Cl. 9—8.3)

(Granted under the act of March 3, 1883, as amended April 30, 1928; 370 O. G. 757)

This invention relates to an electric water light, and has for an object to provide a dependable floating light for use either independently or attached to buoys, rafts, boats, or similar water craft.

A further object of this invention is to provide a substantially unbreakable and dependable water light also intended to act as a seaplane landing light which may be dropped overboard from a boat or from a seaplane while still in the air and which would automatically light up and float in the water to serve as a beacon in guiding the seaplane in locating the surface of the water when landing at night.

A further object of this invention is to provide a dependable electric water light which may be dropped safely into the water from a considerable height and at a considerable velocity as from the top deck of a vessel or from an airplane traveling at night, which will land safely without damage in the water, and which, once it enters the water, will immediately return to the surface thereof and automatically light up.

Still a further object of this invention is to provide a dependable and substantially shatterproof electric water light which may be dropped into the water from a considerable height and at a considerable velocity without damage to the bulb or mechanism thereof.

A further object of this invention is to provide a light that will normally be stored in an inverted position in open circuit condition and will automatically light up as soon as the light is operated to its operating position.

A further object of this invention is to provide an electric water light that may be kept stored or stowed away under extreme adverse conditions of shock and vibration, with such shock and vibration being diminished rather than accentuated and thus not transmitted to the filament of the lamp, thereby insuring indefinite life of the lamp bulb while in stored position. This light is of a nature that is to be used particularly on destroyers and will be kept stored on the deck thereof near life rings or the like. Destroyers are notorious for the amount of shock and vibration continuously going on, especially while in heavy seas, and all war vessels are subject to heavy shock while on active duty, particularly while gun-fire is taking place. Such shock has often been known to shatter filaments of the lamp bulbs in the vessel. It is an object of this invention to so mount the lamp bulb of this light and so connect it to its mechanism that a sufficient amount of this shock and vibration is absorbed so that the filament of the lamp bulb will not be affected thereby.

A further object of this invention is to provide an electric water light wherein the battery is separated from the lamp bulb by such an amount of shock absorbing material that substantially no vibration of the battery when in stored position under the adverse conditions just mentioned can be transmitted to the lamp bulb or its filament.

With the foregoing and other objects in view, this invention consists in the construction, combination and arrangement of parts hereinafter described and illustrated in the drawings, in which.

Figure 1:
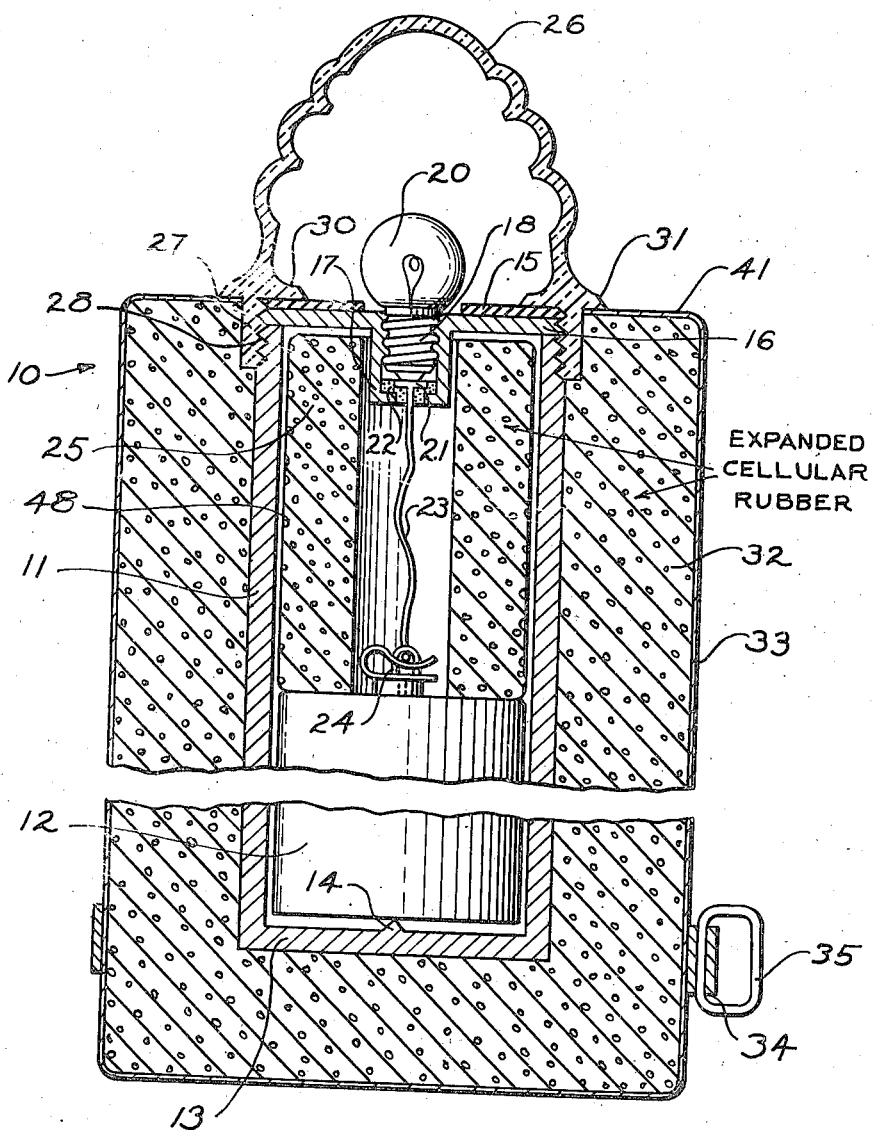
Fig. 1 is a partly sectional longitudinal view of the electric water light of this invention.

There is shown at 10 the electric water light of this invention, consisting of a metal tube 11 of sufficient rigidity and having an internal diameter suitable to receive a tubular flashlight battery means 12 therein. The bottom 13 of the tube 11 is provided with a boss 14 substantially centrally thereof which will serve as a contact with the bottom of the battery 12 when the same is in position thereon. The tube 11 is of a length and diameter considerably greater than the length of the battery means 12 to be placed therein.

Removably secured across the top of the tube 11 is a closure member comprising a yieldable sealing gasket 15 beneath which is a socket base 16 through which extends a lamp socket 17 into which is screwed the lamp base 18 of the bulb 20 until its center contact abuts against the contact 21 embedded in the insulating contact support 22. Extending through this insulating contact support 22 is a conduit wire 23 of a length at least slightly greater than the maximum distance between the battery means 12 when in lowermost position and the socket base 16. The other end of this wire 23 is secured to a spring contact 24 on the top of the tubular battery means 12. The space between the top of the battery means 12 and the bottom of the socket base 16 and about the lamp socket 17 is substantially, but loosely, filled by a hollow spacing, laterally expandable yieldable and resilient shock absorbing and non-transmitting cylinder 25, made of expanded cellular rubber or other material having similar characteristics.

The external diameter of rubber cylinder 25 is just enough less than the internal diameter of the metal casing or tube that the cylinder may drop into or out of the tube of its own weight. However, the slightest pressure on one end of the cylinder with the other end held against movement will cause the cylinder 25 to expand laterally or thicken and thus anchor itself within the tube 11 against movement. Hence, when in inverted position, the greater part of the weight of the cylinder 25 and battery means 12 will be supported directly by the strong casing 11 and not indirectly through the socket base 16, lens skirt 27 and lens skirt threads 28 to the tube 11. On the drawings, for purpose of illustration, the difference between the external diameter of the cylinder 25 and the internal diameter 11 has been greatly exaggerated.

The self-anchoring feature is especially important where the light is to be dropped from greater heights at great velocities. If, however, the light is intended for use where it is to be dropped only from moderate heights, as for instance the low deck of a slow moving vessel, the self-anchoring feature is unimportant and could be omitted or lessened by increasing the space between the inside of the tube and outside of the cylinder. This cylinder 25 is slightly but not substantially less than the distance between the bottom of the socket base 16 and the top of the battery means 12 when in upright position, and it will be also noted that the bottom of the socket 17 extends into the hollow space within the upper end of the cylindrical shock absorbing tube 25, even when in this upright position. When in inverted position, as shown in Fig. 2, the battery means 12 moves away by its own weight from contact with the boss 14 and is resiliently supported on the shock absorbing cylinder 25, which expands to anchor itself against the inside of tube 11.

The gasket 15 and socket base 16 are held on the tube 11 by means of the fresnel lens 26. This fresnel lens 26 will be preferably made of non-breakable transparent material such as transparent plastic or suitable reinforced glass. This lens 26 has a depending skirt 27 internally threaded to cooperate with an external thread 28 on the upper and outer end of the tube 11. An internal flange 30 extending over the gasket 15 holds the gasket 15 and socket base 16 in proper position, thus holding the metallic socket base 16 in good metallic and electrical contact with the upper end of the tube 11. An external flange 31 on the lens 26 cooperates with the upper end of a cylindrical tubular overcoat 32, also made of expanded cellular rubber, which is a tight fit about the tube, or may be vulcanized thereto, if desired. Surrounding this overcoat 32 is a canvas reinforcement 33, provided at 34 with a belt also of canvas to which is attached a ring 35 for cooperation when desired with the painter 36 of a life ring or other life saving apparatus 37.

Figure 2:
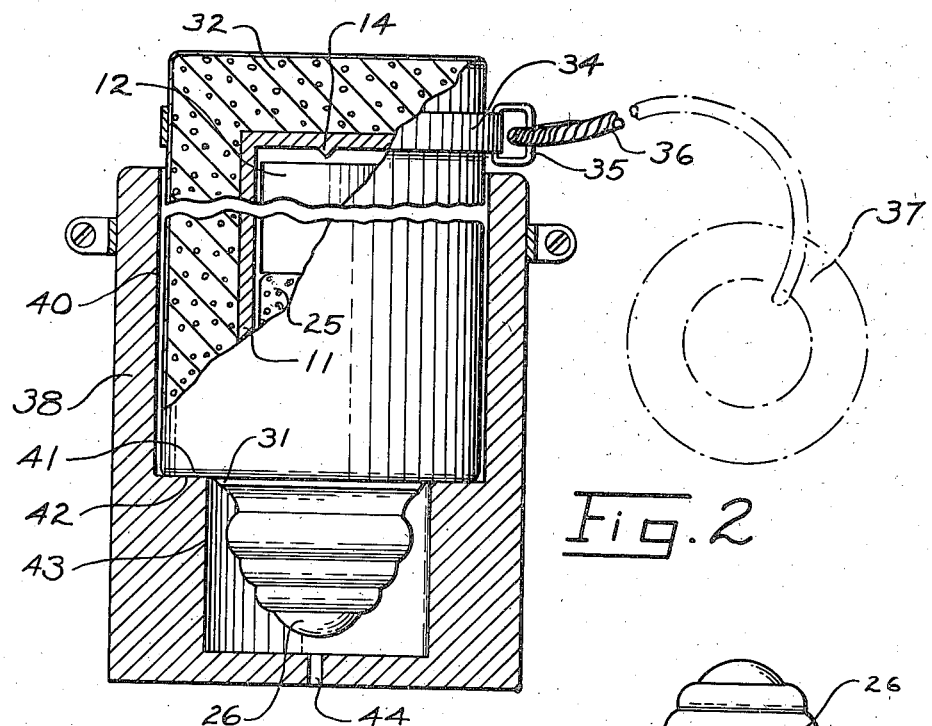
Fig. 2 is a partly sectional, partly schematic view on a reduced scale of the light in stored position in a rack support.

When the lamp 10 is in stored position it must be inverted, as shown in Fig. 2, thus breaking the circuit between the boss 14 and the bottom of the battery means 12. As shown in Fig. 2, it will preferably be stored upside down in a counterbored support 38 having a large bore 40 of a diameter to receive the light 10 therein when the upper end 41 of the expanded cellular rubber overcoat rests on a shoulder 42 connecting the bore 40 to a counterbore 43, the diameter of the counterbore 43 being sufficiently greater than the diameter of the flange 31 that there will be no contact between the shoulder 42 and the flange 31. The bottom of the counterbore 43 may be provided with a drainage opening 44 so that any moisture or water washed up on the deck of the vessel and leaking into the bore 40 will immediately drain therefrom.

In operation, the skirt 27 cooperating with the cellular rubber overcoat 32 and the upper end of tube 11 prevents any possibility of moisture leaking into the tube to short-circuit the battery 12 and interfere with the operation of the light. The electric water light assembly, as above described, is carried in the rack or support 38, as shown in Fig. 2. In this position the battery means 12 is out of contact with the boss 14 and rests on the inverted end of the shock absorbing cylinder 25. The rack or support 38 may be located adjacent a life saving device 37 with one of the lights 10 connected thereto, while the remainder of a series of lights in the same rack may be intended for separate use. The support or rack 38 may be similarly used in an air or seaplane.

While in stored position the rubber overcoat 32 supports the entire weight of the light 10 on the shoulder 42 so that any vibration of the vessel or plane on which the rack is carried is at least partially absorbed by this overcoat 32. Any vibration induced in the battery means 12 is absorbed by the cylindrical tube 25 on which it is resiliently supported, and thus none of the vibration of the battery means 12 can be transmitted to the socket base 16 to injure or break the lamp filament while it is in stored position. This insures that the lamp will be in good condition, ready for use, even though a long period has elapsed while it is in the supporting rack, thus making it ready for the emergency whenever it may occur. When it is needed the light 10 is merely removed from its supporting rack 38, either alone or in combination with the life saving apparatus 37, and thrown overboard. Irrespective of what position it may be in when it strikes the water, it will immediately return to the surface of the water, floating lens end upright, the length of the tube 11 and the concentration of weight in battery means 12 being such that the center of gravity of the entire light is substantially below the center point of the light, while due to the presence of the lightweight cellular rubber overcoat 32 the specific gravity of the light as a whole is such that it will float with the lens 26 just the right distance above the water line.

Figures 3, 4:
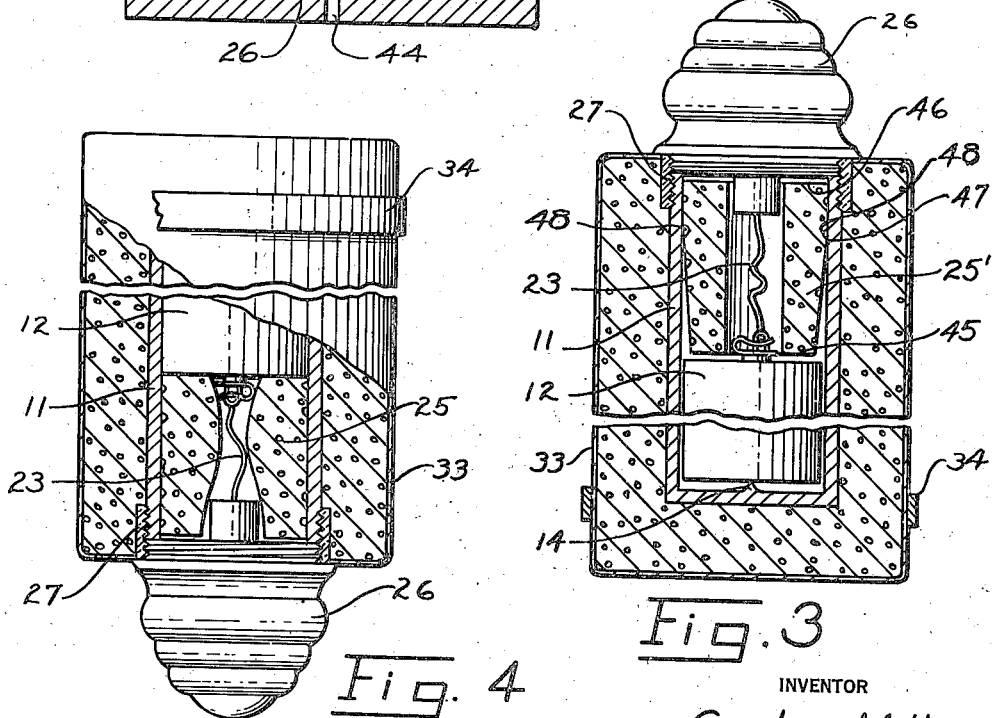
Fig. 3 is a view similar to Fig. 1 of a slightly modified form.
Fig. 4 is a partly sectional view of this device in operative position.

Should the light be dropped from an airplane at considerable velocity and substantial height, it would still land without damage and operate safely, due to the structure described, even though it may land directly on the lens 26. In such case the battery means 12 may travel through the tube 11 toward the socket base 16, but the expanded cellular rubber cylinder 25 will merely shorten in length and thicken in diameter both internally and externally, as shown in Fig. 3, and anchor itself within the tube 11, to resiliently absorb the shock produced by the weight of the battery without letting the center of gravity of the light as a whole be changed beyond the midpoint of the light as a whole. The cylinder 25 after absorbing the shock will then re-expand, pushing the battery means downwardly with some force to bring the bottom of the battery means 12 into contact in circuit completing position with the boss 14, the circuit then passing from the battery bottom to the boss 14, tube 11, the socket base 16, the lamp threads and filament to the contact 21 and through the wire 23 and battery means contact 24, completing the circuit.

The cylinder 25 being of resilient expanded cellular rubber cannot possibly crumple or crush, irrespective of how great a shock it may receive when striking the water, and will inevitably return the battery means 12 to the circuit closing position, causing the water light to light up immediately upon, or even before, its return to the surface of the water.

The expanded cellular rubber overcoat 32 not only assists in providing floatability and waterproofing characteristics to the electric water light but also provides shock absorption as the light strikes the water surface, preventing damage or injury thereto.

The self-anchoring feature described above may be greatly increased by utilizing the modification shown in Fig. 3, wherein expanded cellular rubber cylinder 25' has its external diameter slightly increased from the battery end 45 toward the lamp socket end 46, so that between about the point 47 and the end 46 the diameter of the cylinder 25' is equal to, or slightly greater than, the internal diameter of the tube 11. As thus formed the cylinder 25' may be easily assembled because it may be easily pushed in until the end 46 is just slightly below the upper end of tube 11, while the end 45 will be thus held slightly spaced from the top of battery means 12.

As a means for further intensifying the self-anchoring feature of the cylinder 25 or 25' to the inside of the tube 11, the outside of the cylinder instead of having a smooth finish, as is customary with expanded cellular rubber articles, may have a "raw" or cut finish, that is, the cylinder may be initially molded to a somewhat greater diameter and then the outer smooth finish produced by the molding may be cut away, reducing the cylinder to the proper diameter, with a number of cells cut through, as shown at 48. These cut cells 48 left on the outer surface of the cylinder will act like little vacuum cups and help to anchor the cylinder against the inside of the tube 11.

When it is necessary to dis-assemble the light in order to replace a burnt out battery, the lens is unthreaded, permitting the lamp socket and socket base to be removed from the end of the tube 11, conduit 23 being sufficiently long to permit the lamp socket to be moved completely to one side of the end of the tube 11. Inserting one's fingers within the upper end of the hollow of the cylinder 25' and then bending it into contact with the side thereof, would enable one to easily remove the cylinder 25' by merely pulling it out, because such action will attenuate or lengthen the cylinder at its inside, temporarily decreasing the external diameter of the cylinder 25' between the point 47 and end 46 until it is less than the internal diameter of the tube and let it slide out very easily.

After the tube is replaced, the cylinder may be easily pushed back into proper operative position.

In Fig. 4 there is shown the effect of the weight of the battery means 12 when in inverted position, resting on the hollow cylinder 25 or 25', causing the material of the rubber cylinder to flow into self-anchoring relation to the inside of the tube 11 and thus transmit the major portion or the entire portion of the weight of the cylinder and the battery means directly to the tube 11. This is an important feature and an important distinction over the provision of a spacing cylinder of the rigid, or at least non-resilient, material, which would transmit the entire weight and shock of the momentum of the battery means 12 to the bottom of the socket base 16 which would, under conditions of being dropped from a great height or at a great velocity, or both, tend to drive the entire lamp socket base and lens out of the tube 11, causing failure of the light under the emergency conditions when it is most needed.

Obviously, if desired to project a beam upwardly as well as horizontally, a reflector surface may be placed on the top of the gasket 15 to increase the amount of vertical light. The water light of this invention is thus watertight, positively buoyant, non-absorbent of water, lights automatically upon becoming immersed in water, immediately assumes an upright position, and furnishes a brilliant light for long periods of time for illumination or marking positions. When possible, after use, it may be salvaged for reuse, the batteries being easily replaceable by temporarily removing the lens, socket base and hollow cylinder.

Other modifications and changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, said shock absorbing means being laterally expandable, under initial pressure when pressed by the battery means, into contact with the inner surface of said tube to anchor itself thereto, and to transmit further pressure to said tube, and conduit means connecting the lamp socket to the battery means, said spacing shock absorbing means comprising expanded cellular rubber.

2. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, laterally expandable self-anchoring means spacing said battery means from said closure, a rough outer surface on said laterally expandable means causing said means, when in peripheral contact with the inner surface of said tube, to anchor itself thereto, and conduit means connecting the lamp socket to the battery means.

3. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means, said spacing shock absorbing means comprising expanded cellular rubber adapted to expand laterally when pressed by the battery means and anchor itself to said tube adjacent said closure end.

4. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, yieldable, resilient means spacing said battery means from said closure, said resilient means being laterally expandable, under initial pressure when pressed by the battery means, into contact with the inner surface of said tube to anchor itself thereto, and to transmit further pressure to said tube, and conduit means connecting the lamp socket to the battery means.

5. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means, said spacing shock absorbing means comprising a slightly tapered expanded cellular rubber cylinder having its larger end snug fitting within the tube to anchor said rubber cylinder to said tube when the smaller end of said cylinder is compressed.

6. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, said shock absorbing means being laterally expandable, under initial pressure when pressed by the battery means, into contact with the inner surface of said tube to anchor itself thereto, and to transmit further pressure to said tube, and conduit means connecting the lamp socket to the battery means, said spacing shock absorbing means comprising a resilient, yieldable, hollow cylinder filling the greater part of the space between the top of the battery means and the bottom of the closure means.

7. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, said shock absorbing means being laterally expandable, under initial pressure when pressed by the battery means, into contact with the inner surface of said tube to anchor itself thereto, and to transmit further pressure to said tube, and conduit means connecting the lamp socket to the battery means, said spacing shock absorbing means comprising a hollow cylinder filling the greater part of the space between the top of the battery means and the bottom of the closure means, said cylinder being of expanded cellular rubber.

8. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means, said spacing shock absorbing means comprising a hollow cylinder filling the greater part of the space between the top of the battery means and the bottom of the closure means, the external diameter of the cylinder, at least in part, being not greater than the internal diameter of said tube, said cylinder being of yieldable, laterally expandable material.

9. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means within said tube spacing said battery means from said closure, and conduit means connecting the lamp socket to the battery means, said spacing shock absorbing means comprising a hollow cylinder filling the greater part of the space within the tube between the top of the battery means and the bottom of the closure means, said cylinder being of expanded cellular rubber having cut cells on its outer surface providing self-anchoring vacuum cups against the inside of said tube.

10. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, said shock absorbing means being laterally expandable, under initial pressure when pressed by the battery means, into contact with the inner surface of said tube to anchor itself thereto, and to transmit further pressure to said tube, and conduit means connecting the lamp socket to the battery means, said spacing shock absorbing means comprising a hollow cylinder filling the greater part of the space within the tube between the top of the battery means and the bottom of the closure means, said cylinder being of expanded cellular rubber, said conduit extending from said lamp socket to said battery means through said hollow cellular rubber cylinder.

11. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means, said spacing shock absorbing means comprising a hollow cylinder filling the greater part of the space between the top of the battery means and the bottom of the closure means, said cylinder being of expanded cellular rubber having a rough outer self-anchoring surface.

12. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, a lamp socket base, said lamp socket extending through said base, shock absorbing means spacing said battery means from said closure, and conduit means connecting the lamp socket to the battery means, said spacing shock absorbing means comprising a hollow cylinder filling the greater part of the space within the tube between the top of the battery means and the bottom of the closure means, said cylinder being of expanded cellular rubber, said hollow shock absorbing cylinder fitting loosely about the lamp socket and within the upper end of said closed tube to cushion said battery means and lamp socket if the lamp socket end strikes the water as the light is dropped and to maintain the lamp socket end upright with the center of gravity below the center of buoyancy.

13. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means, said spacing shock absorbing means comprising a hollow cylinder filling the greater part of the space within the tube between the top of the battery means and the bottom of the closure means, said cylinder being of laterally expandable expanded cellular rubber, said hollow shock absorbing cylinder fitting within the upper end of said closed tube to cushion said battery means and lamp socket as it expands under pressure of said battery means to anchor itself against the inner surface of said tube if the lamp socket end strikes the water as the light is dropped and to maintain the lamp socket end upright with the center of gravity below the center of buoyancy.

14. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, conduit means connecting the lamp socket to the battery means, and means for supporting and storing said light in inverted non-circuit completing position, comprising a shock absorbing overcoat substantially enclosing said closed tube except for the lamp socket end thereof, and a counterbored rack in which the light may be supported in lamp socket-down position on the shoulder connecting bores of the counterbore, the diameter of the smaller bore being such that the shoulder supports the light only through the shock absorbing overcoat.

15. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, conduit means connecting the lamp socket to the battery means, and means for supporting and storing said light in inverted non-circuit completing position, comprising a shock absorbing overcoat substantially enclosing said closed tube except for the lamp socket end thereof, and a counterbored rack in which the light may be supported in lamp socket-down position on the shoulder connecting bores of the counterbore, the diameter of the smaller bore being such that the shoulder supports the light only through the shock absorbing overcoat, said shock absorbing overcoat being of expanded cellular rubber.

16. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, conduit means connecting the lamp socket to the battery means, and means for supporting and storing said light in inverted non-circuit completing position, comprising a shock absorbing overcoat substantially enclosing said closed tube except for the lamp socket end thereof, and a counterbored rack in which the light may be supported in lamp socket-down position on the shoulder connecting bores of the counterbore, the diameter of the smaller bore being such that the shoulder supports the light only through the shock absorbing overcoat, said shock absorbing means and overcoat both being of expanded cellular rubber, said spacing shock absorbing means comprising a hollow cylinder filling the greater part of the space within the tube between the top of the battery means and the bottom of the closure means, said hollow rubber spacing cylinder having a rough outer surface adapted to grip the inner surface of the tube and cushion said battery means against transmission of vibration to said lamp socket.

17. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, conduit means connecting the lamp socket to the battery means, means for supporting and storing said light in inverted non-circuit completing position, comprising a shock absorbing overcoat substantially enclosing said closed tube except for the lamp socket end thereof, a counterbored rack in which the light may be supported in lamp socket-down position on the shoulder connecting bores of the counterbore, the diameter of the smaller bore being such that the shoulder supports the light only through the shock absorbing overcoat, said shock absorbing overcoat being of expanded cellular rubber, and a painter attaching belt about said cellular rubber overcoat for securing said light to a life saving device.

18. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure indicating a lamp socket, means spacing said battery means from said closure, conduit means connecting the lamp socket to the battery means, and means for supporting and storing said light in inverted non-circuit completing position, comprising a shock absorbing overcoat substantially enclosing said closed tube except for the lamp socket end thereof, and a counterbored rack in which the light may be supported in lamp socket-down position on the shoulder connecting bores of the counterbore, the diameter of the smaller bore being such that the shoulder supports the light only through the shock absorbing overcoat.

19. The combination of a buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, means spacing said battery means from said closure, conduit means connecting the lamp socket to the battery means, and means for supporting and storing said light in inverted non-circuit completing position, comprising a shock absorbing overcoat substantially enclosing said closed tube except for the lamp socket end thereof, and a counterbored rack in which the light may be supported in lamp socket-down position on the shoulder connecting bores of the counterbore, the diameter of the smaller bore being such that the shoulder supports the light only through the shock absorbing overcoat, said shock absorbing overcoat being of expanded cellular rubber.

GUSTAVE MILLER.